(No Model.)
G. H. BRADSHAW.
HANDLE.
No. 455,652. Patented July 7, 1891.
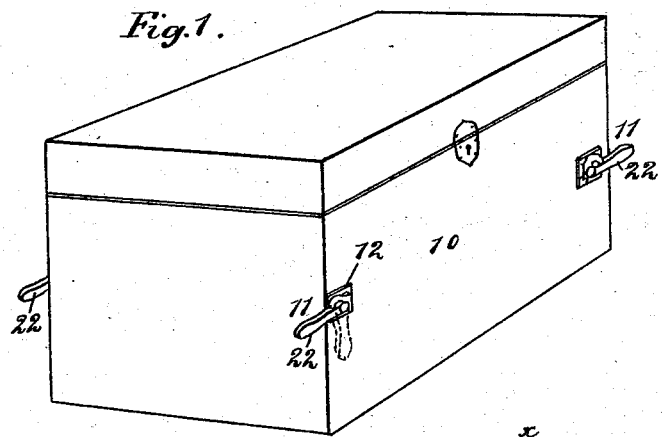
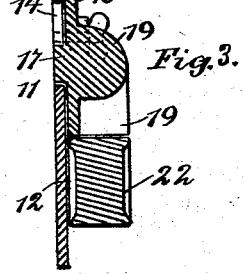
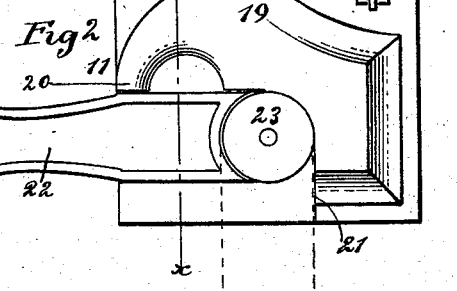
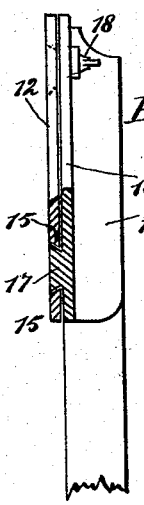
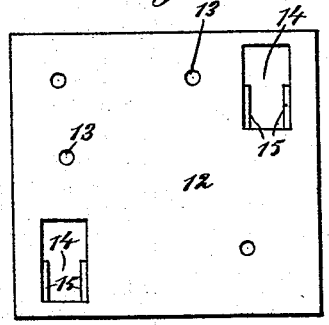
WITNESSES:
INVENTOR:
G. H. Bradshaw
BY Munn & Co
ATTORNEYS

UNITED STATES PATENT OFFICE.

GEORGE H. BRADSHAW, OF KNOXVILLE, TENNESSEE.

HANDLE.

SPECIFICATION forming part of Letters Patent No. 455,652, dated July 7, 1891.

Application filed March 30, 1891. Serial No. 386,994. (No model.)

*To all whom it may concern:*

Be it known that I, GEORGE H. BRADSHAW, of Knoxville, in the county of Knox and State of Tennessee, have invented a new and Improved Handle, of which the following is a full, clear, and exact description.

My invention relates to improvements in handles such as are adapted to be secured to chests, trunks, refrigerators, or other portable articles; and the object of my invention is to produce a simple and convenient handle which may be easily attached to or removed from the article, and which when not in use will drop out of the way, so that it will not be easily broken.

To this end my invention consists in a handle constructed substantially as hereinafter described and claimed.

Reference is to be had to the accompanying drawings, forming a part of this specification, in which similar figures of reference indicate corresponding parts in all the views.

Figure 1 is a perspective view of a chest provided with handles embodying my invention. Fig. 2 is an enlarged detail front elevation of a handle and the plate with which it is connected. Fig. 3 is a vertical cross-section on the line $x\,x$ in Fig. 2. Fig. 4 is a broken sectional plan view on the line $y\,y$ in Fig. 2, and Fig. 5 is a detail rear elevation of the plate to which the handle-plate is secured.

10 is a chest, which is provided at its corners with handles 11, the details of which will be described below. A plate 12 is let into the chest near the corners, the plate having suitable screw-holes 13, to enable it to be easily attached, and in two diagonally-opposite corners of the plate are holes 14, which are square at their upper portions, and which have inwardly-extending dovetail flanges 15 on opposite sides of their lower portions.

A plate 16 is adapted to fit against the face of the plate 12, the said plate 16 having on opposite sides and near diagonally-opposite corners dovetail lugs 17, which lugs are adapted to project into the holes 14 and engage the dovetail flanges 15. It will thus be seen that when the lugs are placed in the upper portion of the holes 14 and the plate 16 dropped the lugs will engage the flanges and prevent the outer plate from falling away from the inner one until the plates are fastened together by the thumb-screw 18. The plate 16 is held in position upon the plate 12 by means of the thumb-screw 18, which extends through the two plates and may project into the chest.

A strong rib 19 is produced on the face of the outer plate 16, and the lower portion of the rib is cut away at one corner, so as to leave an abrupt horizontal shoulder 20 about midway of the plate and on one side and an abrupt vertical shoulder 21 about midway of the plate and on the lower portion, the shoulders 20 and 21 being at right angles to each other, and the shoulders are adapted to form stops for the swinging handle 22, which is hinged to the outer plate, as shown at 23, between the shoulders 21 and 20.

The handle 22 normally drops of its own weight, so that it rests against the shoulder 21, as shown by dotted lines in Figs. 1 and 2, and when the handle is swung into a horizontal position it strikes against the shoulder 20 and extends in a horizontal position from the end of the chest. The handles are secured to the front and back sides of the chest, as shown in Fig. 1, so as to project from the ends, thus bringing them into position to be conveniently grasped by the hands.

When the article to which the handles are attached is to be shipped, the outer plate and handles may be removed, and the article will then occupy but little space and the handles will not be injured.

I have shown the handles as applied to a chest; but it is obvious that they may be secured to any portable article.

Having thus described my invention, I claim as new and desire to secure by Letters Patent—

1. The combination, with a plate adapted to be secured to an article and having projecting shoulders arranged near a side and bottom edge, of a handle pivoted on the plate to swing laterally between the shoulders, substantially as described.

2. The combination of a plate adapted to be secured to an article, a curved rib produced upon the plate and terminating at the ends in shoulders arranged at right angles to each other, and a handle pivoted between the shoulders, substantially as described.

3. The combination of a plate adapted to be secured to an article and provided with holes having dovetail flanges therein, an outer plate having lugs to fit the flanges and shoulders produced near its side and bottom edges, and a handle pivoted on the outer plate, so as to swing against the shoulders, substantially as described.

GEORGE H. BRADSHAW.

Witnesses:
B. F. HALL,
C. McCABE.